United States Patent [19]

Teraoka et al.

[11] Patent Number: 4,856,611
[45] Date of Patent: Aug. 15, 1989

[54] PROPELLING TRANSMISSION SYSTEM OF TRACTOR

[75] Inventors: Akira Teraoka; Hajime Shikiya, both of Sakai, Japan

[73] Assignee: Kubota, Ltd., Osaka, Japan

[21] Appl. No.: 248,361

[22] Filed: Sep. 23, 1988

[30] Foreign Application Priority Data

Jul. 6, 1988 [JP] Japan ................................ 63-168567

[51] Int. Cl.⁴ ............................................. B60K 17/34
[52] U.S. Cl. ..................................... 180/233; 180/900; 180/365
[58] Field of Search ............... 180/233, 240, 244, 245, 180/247, 248, 249, 250, 900, 75.1

[56] References Cited

U.S. PATENT DOCUMENTS

| | | | |
|---|---|---|---|
| 4,574,910 | 3/1986 | Miki et al. ........................... | 180/249 |
| 4,669,559 | 6/1987 | Fukui ............................... | 180/233 X |
| 4,696,365 | 9/1987 | Ishimori et al. ..................... | 180/233 |
| 4,723,622 | 2/1988 | Toshikuni et al. ................... | 180/233 |
| 4,723,623 | 2/1988 | Teraoka et al. ..................... | 180/233 |
| 4,792,009 | 12/1988 | Iritani ............................. | 180/233 |
| 4,798,259 | 1/1989 | Azuma et al. ....................... | 180/233 |

Primary Examiner—John A. Pekar
Attorney, Agent, or Firm—Cushman, Darby & Cushman

[57] ABSTRACT

A propelling transmission system of a tractor comprising a front transmission for driving front wheels and a rear transmission for driving rear wheels. The front transmission receives drive from an engine mounted at a front position of the tractor, through a main clutch housed in a clutch case, and transmits the drive to the rear transmission. The rear transmission returns part of the drive to a front wheel change speed mechanism included in the front transmission. The front transmission is housed in a front transmission case directly connected to a lower rearward position of the clutch case.

8 Claims, 6 Drawing Sheets

PROPELLING TRANSMISSION SYSTEM OF TRACTOR

BACKGROUND OF THE INVENTION

The present invention relates to a propelling transmission system of a tractor comprising a main clutch case connected to a rear face of an engine, both mounted at a front position of the tractor, a rear transmission mounted at a rear position of the tractor for receiving drive from a main clutch and outputting the drive to front and rear wheels, and a front wheel change speed mechanism mounted on a transmission line extending from the rear transmission to the front wheels, the front wheel change speed mechanism being switchable between a standard drive mode for driving the front wheels at substantially the same speed as the rear wheels and a high speed mode for driving the front wheels at a higher speed than the rear wheels.

Conventionally, this type of propelling transmission system has the front wheel change speed mechanism disposed at a lower forward position of the rear transmission mounted at the rear position of the tractor as disclosed in U.S. Pat. No. 4,574,910.

The front wheel change speed mechanism is thus disposed at or adjacent the rear position of the tractor. Consequently, the center of gravity of the tractor is biased to the rear of the tractor, which adds to the tendency for the center of gravity to be already in the rear with a working implement such as a plow attached to the rear of the tractor. This situation requires a very heavy balancing weight to be mounted at the front of the tractor.

SUMMARY OF THE INVENTION

The object of the present invention is to provide a propelling transmission system including a front wheel change speed mechanism provided in a compact manner while avoiding the center of the gravity being biased to the rear of the tractor.

In order to achieve this object, a propelling transmission system of a tractor according to the present invention comprises a main transmission mechanism including an input shaft for receiving, through a main clutch mechanism, drive from an engine mounted at a front position of the tractor, and a first transmission shaft disposed parallel to the input shaft and operatively connected thereto; a rear transmission disposed at a rear position of the tractor for receiving the drive from the first transmission shaft; front wheel drive means including a second transmission shaft disposed parallel to the first transmission shaft and receiving the drive from the rear transmission; front wheel change speed means for receiving the drive from the second transmission shaft and transmitting the drive to front wheels selectively in a standard drive mode for driving the front wheels substantially at the same speed as the rear wheels and in a high speed mode for driving the front wheels at a higher speed than the rear wheels; and a front transmission case housing the main transmission mechanism, front wheel drive means and front wheel change speed means, the front transmission case being directly connected to a lower rearward position of a main clutch case.

According to the above construction, the front wheel change speed means is contained in the front transmission case connected to a rear face of the main clutch case. The front wheel change speed means is thus mounted at a forward position of the tractor, which results in the center of gravity of the entire tractor shifted forwardly compared with the case of the front wheel change speed means being connected to the forward end of the rear transmission case. Since the center of gravity is shifted forwardly, the balancing weight at the front of the tractor may be lightened or dispensed with. This construction thus allows the tractor to have a small overall weight and body frames and the like to be simplified.

The positional relationship between the front wheel change speed means and a necessary reduction mechanism in the above construction is opposite to the relationship in a construction wherein the front wheel change speed means is mounted in a front axle case for balancing the tractor with respect to its center of gravity. In the construction of the present invention, therefore, transmitted torque may be small and the front wheel change speed means may be of small size too.

Generally, the front wheel change speed means and the main transmission mechanism are mounted in separate, interconnected cases since the change speed means and main transmission mechanism are not directly connected to each other. In this case there are at least peripheral walls of these cases at a joint therebetween, and gears of the front wheel change speed means and the main transmission mechanism must be disposed apart from each other by the thickness of the peripheral walls. In the present invention, however, the front wheel change speed means and the main transmission mechanism are mounted in the same case. This construction allows these gears to be positioned at a minimum distance to each other, and hence the front wheel change speed means and the main transmission mechanism may be arranged close to each other. Consequently, a sufficient height from the ground is secured even though the front wheel change speed means is disposed below the main transmission mechanism. Thus, according to the present invention, reduction in the height from the ground may be avoided by changing the position of the front wheel change speed means while disposing at a low position the transmission shaft for transmitting the drive from the main transmission mechanism to the rear transmission.

In a preferred embodiment of the invention, the front wheel change speed means is contained in a position below a clutch sleeve for operating the main clutch mechanism. This construction has the advantage of filling the space below the clutch sleeve. That is, space utilization is improved by effective use of the free space below the clutch sleeve. Where the front transmission case is connected to the rear face of the main clutch case, the two cases are arranged longitudinally of the tractor in a space provided therefor, with the front transmission case projecting rearwardly. In the present invention, however, the front transmission case rearwardly projects to the less extent for the containment of the front wheel change speed means adjacent the main clutch case. This construction has the further advantage of requiring a short transmission shaft extending from the front wheel change speed means to the front axle case.

In a further preferred embodiment, the input shaft and the first transmission shaft are arranged one above the other. Since in this case the drive is not output from the main clutch case to the rear transmission case by an output shaft extending from the main clutch case but by the transmission shaft which is disposed lower than the output shaft. This transmission shaft is connected to an input shaft of the rear transmission case through a drive shaft and other associated elements which may be disposed lower than in the case of connecting the output shaft of the main clutch case to the input shaft of the rear transmission case. This construction allows the driver's deck to be located at a low level over the drive shaft and associated elements, thereby allowing the driver to mount the tractor with ease and reducing the tractor height with a driver's seat disposed at a low position.

In a different embodiment of the invention, the propelling transmission system further comprises a steering gear box supporting a pitman arm, and a mechanical linkage connecting the pitman arm to the front wheel change speed means for switching the front wheel change speed means to the high speed mode in response to a steering operation exceeding a predetermined amount, the steering gear box being disposed adjacent the engine.

According to this construction, the pitman arm which is operable with a steering operation is disposed adjacent and connected by the mechanical linkage to the front wheel change speed means. A steering operation exceeding the predetermined amount establishes the high speed mode. The mechanical linkage may comprise a simple element such as a link plate or a link arm since the pitman arm and the front wheel change speed means are disposed close to each other.

In a further preferred embodiment, the steering gear box supporting the pitman arm and the front transmission case supporting, for example, a control arm of the front wheel change speed means are directly interconnected, with the pitman arm and the control arm interconnected by the mechanical linkage. This construction allows the pitman arm and the control arm to be easily assembled into a relative positional relationship as designed, compared with the case of attaching the steering gear box to the main clutch case.

Thus, by strictly controlling the dimensions of the pitman arm for attachment to the steering gear box and of the control arm for attachment to the front transmission case, fine assembly adjustment is not required in interconnecting the pitman arm and the control arm with the mechanical linkage after attaching the two arms to the steering gear box and the front transmission case, respectively. The front wheel change speed means of this type must positively be switched to the high speed mode with a steering operation exceeding a predetermined amount (40°). The present invention prevents variations in the timing of switching to the high speed mode, which variations result from mismatching due to connection errors between the pitman arm and the control arm, thereby realizing excellent running control.

In a still further embodiment of the invention, the front wheel change speed means comprises an accelerating mechanism. Then the drive is output to the front axle case at a higher speed than in the prior art. The high speed output reduces shaft torque, which requires only small transmission gears housed in the front axle case and permits the latter to be small. The front axle case reduced in size realized an increased height from the ground to be less affected by obstacles on the ground.

Other features and advantages of the present invention will be apparent from the following description of the preferred embodiment to be had with reference to the drawings.

BRIEF DESCRIPTION OF THE DRAWINGS

The drawings illustrate a propelling transmission system of a tractor according to the present invention, in which.

DESCRIPTION OF THE PREFERRED EMBODIMENT

Figure 1:
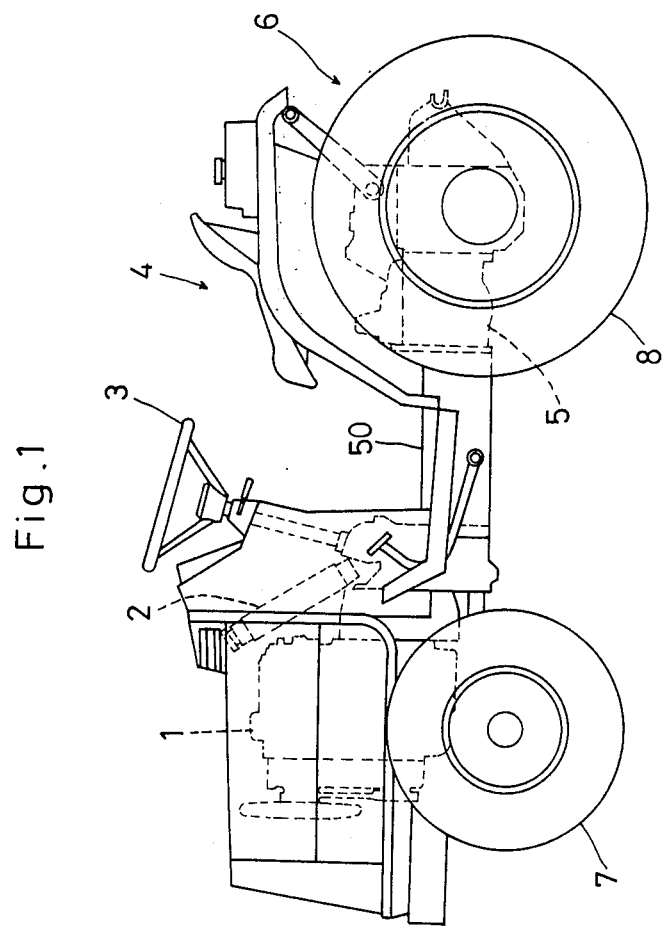
FIG. 1 is a side view of a tractor.

FIG. 1 shows a four wheel drive agricultural tractor comprising an engine 1 and a radiator 2 mounted on the front of a tractor frame, a driver's section 4 having a steering wheel 3 rearwardly of the radiator 2, a rear transmission 5 rearwardly of the driver's section 4, and a link mechanism 6 for vertically movably connecting a working implement such as a plow to the rear of the tractor. The frame carrying these components is supported by front wheels 7 and rear wheels 8.

Figure 2:
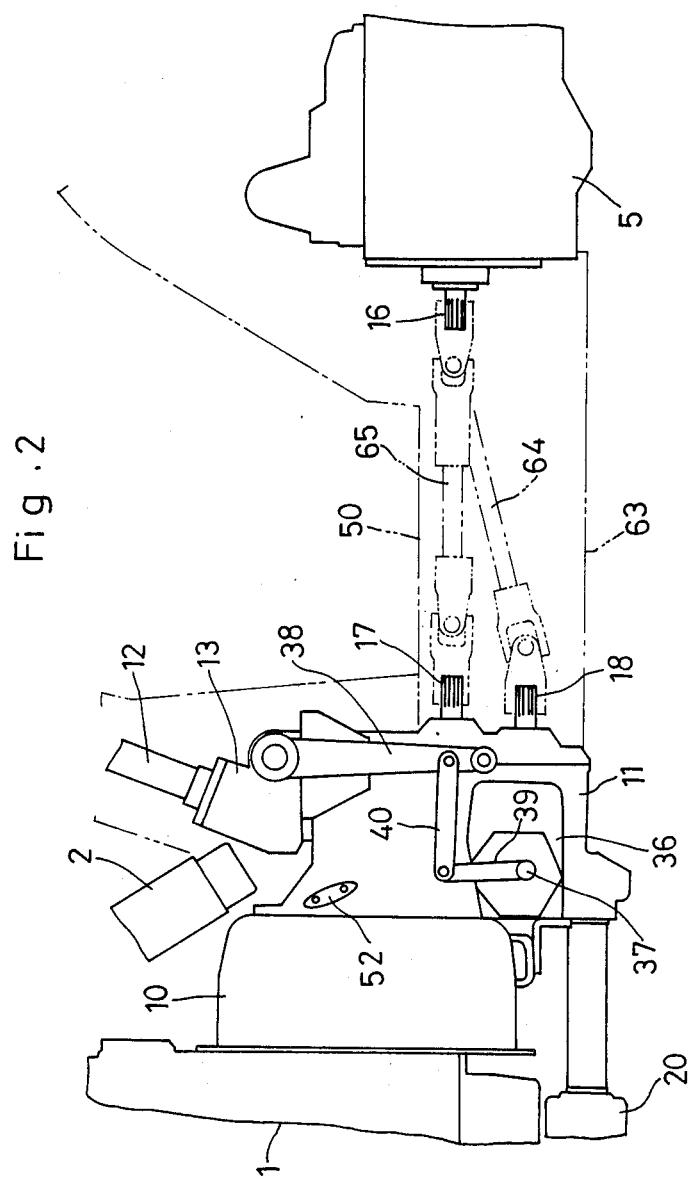
FIG. 2 is a side view showing an arrangement of a main clutch case, an engine and a front transmission case.
Figure 3:
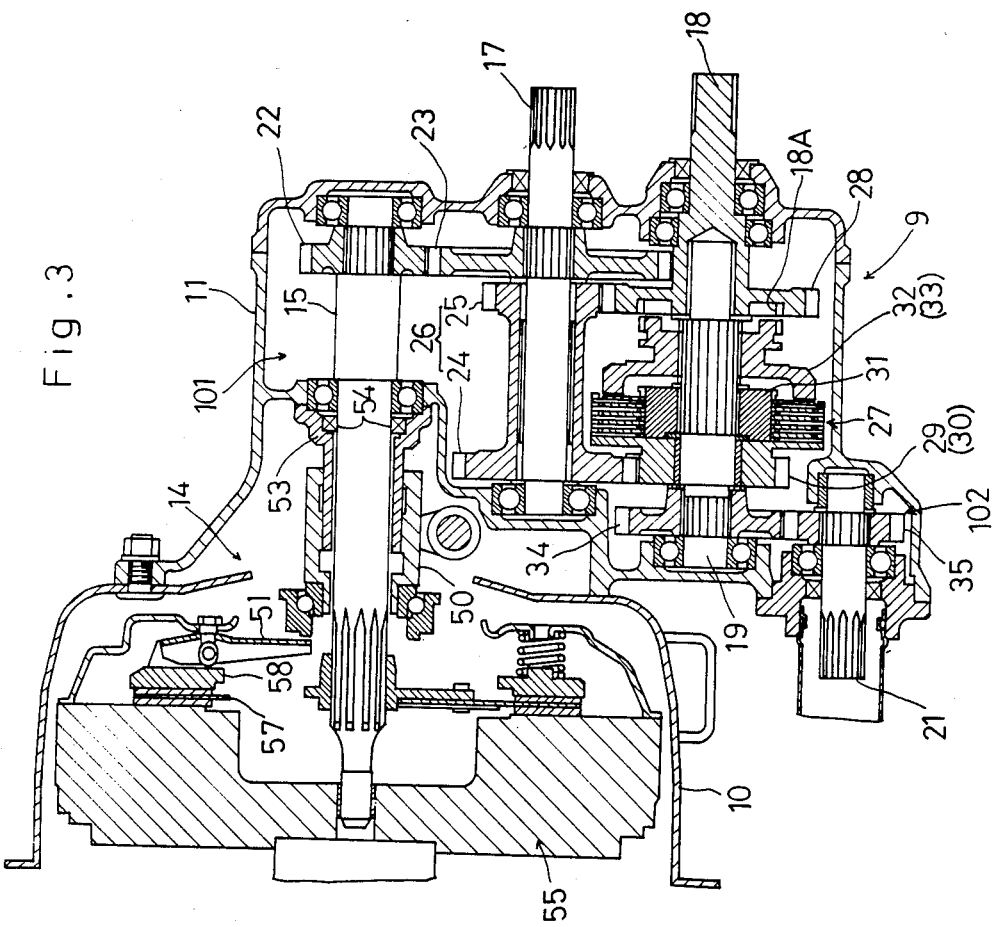
FIG. 3 is a side view in vertical section of a front transmission.

Referring to FIGS. 2 and 3, a main clutch case 10 is connected to a rear face of the engine 1, and a front transmission case 11 housing a front wheel transmission 9 is secured to a rear face of the main clutch case 10. A steering shaft 12 is connected to a steering gear box 13 secured to a top face of the front transmission case 11.

The main clutch case 10 houses a main clutch mechanism 14 comprising a single type dry clutch and including a clutch disk 57, a pressure plate 58 for pressing the clutch disk 57 upon a flywheel 55, a clutch sleeve 50 disposed rearwardly of the clutch plate 58, and a control arm 52 for pressing the clutch sleeve 50 upon a diaphragm spring 51 to retract the pressure plate 58 from pressure contact with the clutch disk 57. The clutch sleeve 50 is slidably mounted on a sleeve guide 53 which in turn is mounted on an input shaft 15 of the front wheel transmission 9. The sleeve guide 53 is inserted into and supported by a boss defined on a boundary wall between the clutch case 10 and the front transmission case 11. An oil seal 54 is mounted in a position of the sleeve guide 53 opposed to the boundary wall for preventing oil leakage from the front transmission case 11. The sleeve guide 53 is thus removable forwardly without disassembling the front transmission case 11.

The input shaft 15 extends from the clutch case 10 to be supported inside the front transmission case 11. The front transmission case 11 houses and supports a first transmission shaft 17 disposed below the input shaft 15 for transmitting the drive to an input shaft 16 of the rear transmission 5, a second transmission shaft 18 disposed below the first transmission shaft 17 for receiving front wheel drive from the rear transmission 5, a third transmission shaft 19 disposed coaxial to the second transmission shaft 18 and having a rear end thereof relatively rotatably inserted into a forward end of the second transmission shaft 18, and a fourth transmission shaft 21 disposed below the third transmission shaft 19 and extending to a front axle case 20. The rear transmission 5 includes main and auxiliary change speed mechanisms, a backward and forward drive switching mechanism, a differential mechanism. The second transmission shaft 18 noted above received the drive having been subjected to change speed in the rear transmission 5.

The input shaft 15 transmits the drive to the first transmission shaft 17 through a first gear 22 mounted on the input shaft 15 and a second gear 23 mounted on the first shaft 17. The drive transmitted from the first shaft 17 to the rear transmission 5 is returned as the front wheel drive to the second transmission shaft 18. The first shaft 17 carries, for relative rotation therewith, a relay member 26 including a large, third gear 24 and a small, fourth gear 25 as integral parts thereof. The third shaft 19 carries a frictional multidisk clutch 27. A fifth gear 28 is formed integrally with the forward end of the second shaft 18. The clutch 27 includes a clutch body 30 defining a sixth gear 29 in constant mesh with the third gear 24, a rotatably element 31 cooperating with the clutch body 30 to support friction disks, and a clutch sleeve 33 defining a piston 32 at a forward end thereof for acting on the friction disks and an external gear engageable with and disengageable from an internal gear 18A defined in the second shaft 18. The third shaft 19 transmits the drive to the fourth shaft 21 through a seventh gear 34 splined to a forward end of the third shaft 19 and an eighth gear 35 splined to a rear end of the fourth shaft 21.

When the clutch sleeve 33 is shifted into engagement with the internal gear 18A of the second transmission shaft 18, the drive is transmitted from the second shaft 18 to the third shaft 19 through the clutch sleeve 33. This position provides a standard drive mode wherein the front wheels 7 and the rear wheels 8 are driven at substantially the same speed. When the clutch sleeve 33 is shifted in the opposite direction to place the clutch 27 in operation, the drive is transmitted from the second shaft 18 to the third shaft 19 through the relay member 26 and clutch body 30. This position provides a high speed mode wherein the front wheels 7 are driven at a higher speed than the rear wheels 8.

Figure 4:
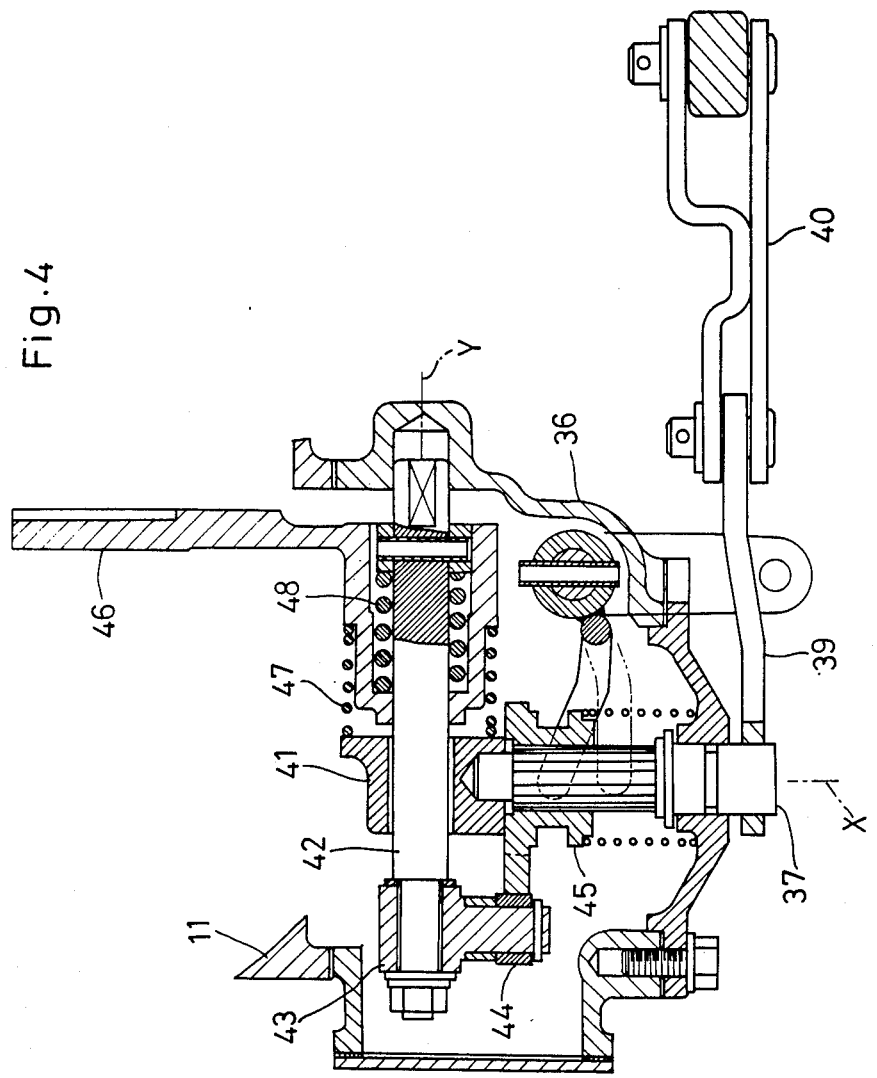
FIG. 4 is a plan view in cross section of a control mechanism for controlling the front transmission.
Figure 5:
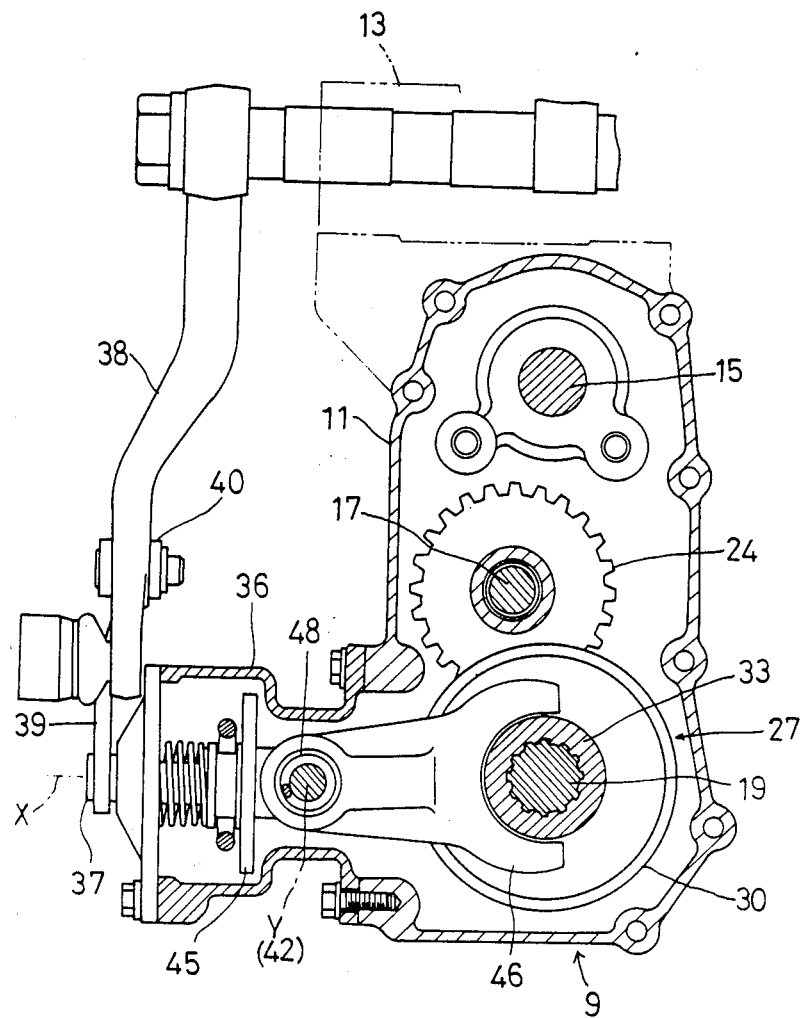
FIG. 5 is a rear view in vertical section of the control mechanism.
Figure 6:
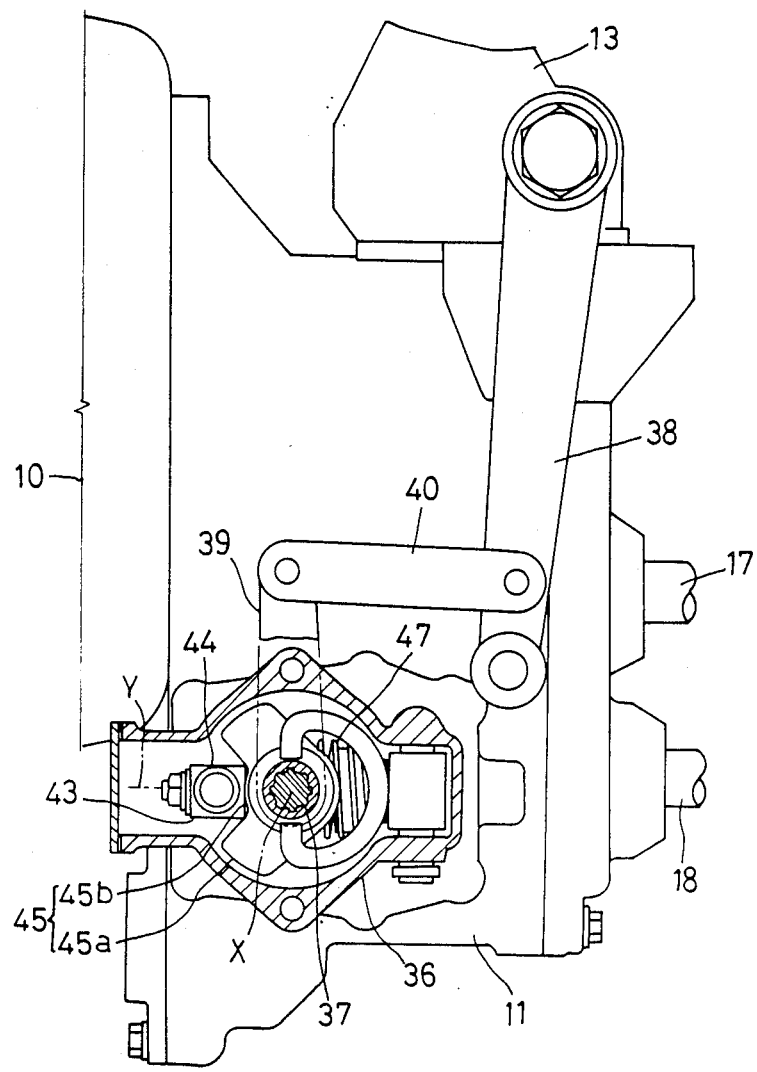
FIG. 6 is a side view in vertical section of the control mechanism.

A mechanism for controlling the described front wheel transmission 9 will now be described with reference to FIGS. 4 through 6. As seen, this control mechanism is assembled into a cassette type construction removably attached to a lateral wall of the front transmission case 11. This control mechanism includes a mounting case 36, and a control shaft 37 rotatably supported by the mounting case 36 and extending transversely of the tractor. A pitman arm 38 supported by the steering gear box 13 is connected by a mechanical linkage comprising a link plate 40 to a control arm 39 fixed to the control shaft 37. The clutch 27 is thus interlocked with the steering mechanism. The control shaft 37 has an inward end rotatably supported by a supporting holder 41. The supporting holder 41 also supports a slide rode 42 extending to an inside wall of the mounting case 36 and slidable along an axis Y perpendicular to the axis X of the control shaft 37. The slide rod 42 carries a roller 44 mounted at one end thereof through a support element 43. The control shaft 37 carries a cam plate 45 splined thereto to be rotatably with the control shaft 37 and slidable along the axis X. As shown in FIG. 6, the cam plate 45 defines cam surfaces including large diameter portions 45a and a small diameter portion 45b for acting on the roller 44 with rotation about the axis X of the cam plate 45, to shift the slide rod 42 in opposite directions along the axis Y. As seen in FIG. 4 and 5, the slide rod 42 carries, at the end thereof opposite the end on which the support element 43 is mounted, a shift fork 46 which acts on the clutch sleeve 33 of the front wheel transmission 9. The shift fork 46 is urged to neutral by a first spring 47 provided between the support holder 41 and a proximal end of the shift fork 46 and a second spring 48 provided between the slide rod 42 and the proximal end of the shift fork 46. Movement of the shift fork 46 is limited by the engagement between the cam plate 45 and the roller 44. When the amount of steering does not exceed a predetermined amount (40° turning angle), the small diameter portion 45b of the cam plate 45 is opposed to the roller 44 as shown in FIG. 6. At this time the roller 44 and the small diameter portion 45b are spaced apart from each other, and the shift fork 46 is located at a righthand position in FIG. 4 for placing the clutch sleeve 33 in mesh with the internal gear 18A to provide the standard drive mode. With a further steering operation to swing the pitman arm 38, one of the large diameter portions 45a acts on the roller 44 to move the slide rod 42 leftward in FIG. 4. Then the clutch 27 comes into operation to provide the high speed mode. The cam plate 45 may be moved by a shift fork along the axis X of the control shaft 37 away from the position opposed to the roller 44. Then the steering operation does not cause the cam plate 45 to move the slide rod 42. Thus the shift fork acts as a mechanism for nullifying the high speed mode.

Reverting to FIG. 2, the front transmission case 11 and the rear transmission 5 is interconnected by a box-shaped sheet metal frame 63 which houses transmission shafts 64 and 65 for transmitting the drive between the front and rear transmissions. The bottoms of the front and rear transmissions define a lowermost part of the tractor body, with the engine 1 and the clutch case 10 disposed thereabove. Thus the tractor body is at a high level above the ground.

It will be understood that the steering gear box 13 and the front transmission case 11 may be integrated into a unit. Further, the mechanical linkage 40 may comprise a wire or other element.

What is claimed is:

1. A propelling transmission system of a tractor comprising;
   a main transmission mechanism including an input shaft for receiving, through a main clutch mechanism, drive from an engine mounted at a front position of the tractor, and a first transmission shaft disposed parallel to the input shaft and operatively connected thereto,
   a rear transmission disposed at a rear position of the tractor for receiving the drive from the first transmission shaft,
   front wheel drive means including a second transmission shaft disposed parallel to the first transmission shaft and receiving the drive from the rear transmission,
   front wheel change speed means for receiving the drive from the second transmission shaft and transmitting the drive to front wheels selectively in a standard drive mode for driving the front wheels substantially at the same speed as the rear wheels and in a high speed mode for driving the front wheels at a higher speed than the rear wheels, and
   a front transmission case housing the main transmission mechanism, front wheel drive means and front wheel change speed means, the front transmission case being directly connected to a lower rearward position of a main clutch case.

2. A propelling transmission system as claimed in claim 1, wherein the front wheel change speed means is disposed downwardly of a clutch sleeve for connecting and disconnecting the main clutch mechanism to/from the input shaft.

3. A propelling transmission system as claimed in claim 1, wherein the input shaft and the first transmission shaft are operatively connected to each other by gearing.

4. A propelling transmission system as claimed in any one of claims 1 to 3, wherein the front wheel change speed means includes
 a relay member relatively rotatably mounted on the first transmission shaft and including a pair of gears,
 a third transmission shaft disposed coaxially with the second transmission shaft, and
 a clutch mechanism mounted on the third transmission shaft for selecting between a first transmission mode in which the drive is transmitted without change speed from the second transmission shaft to the third transmission shaft and a second transmission mode in which the drive is transmitted from the second transmission shaft to the third transmission shaft through the relay member for effecting change speed.

5. A propelling transmission system as claimed in claim 4, wherein the third transmission shaft is connected through an accelerating means to a fourth transmission shaft operatively connected to the front wheels.

6. A propelling transmission system as claimed in claim 1, further comprising a steering gear box supporting a pitman arm, and a mechanical linkage connecting the pitman arm to the front wheel change speed means for switching the front wheel change speed means to the high speed mode in response to a steering operation exceeding a predetermined amount, the steering gear box being disposed adjacent the engine.

7. A propelling transmission system as claimed in claim 6, wherein the steering gear box is directly connected to a top surface of the front transmission case.

8. A propelling transmission system of a tractor comprising;
 an engine mounted at a front position of the tractor,
 a rear transmission disposed at a rear position of the tractor,
 a main transmission mechanism for receiving drive from the engine through a main clutch mechanism, and transmitting the drive to the rear transmission,
 front wheel drive means for receiving the drive from the rear transmission,
 front wheel change speed means for receiving the drive from the front wheel drive means and transmitting the drive to accelerating means operatively connected to front wheels, the front wheel change speed means being contained in a position downwardly of a clutch sleeve for operating the main clutch mechanism, and
 a front transmission case housing the main transmission mechanism, front wheel drive means and front wheel change speed means, the front transmission case being directly connected to a lower rearward position of a main clutch case.

* * * * *